(12) United States Patent
Johnsson

(10) Patent No.: US 6,845,761 B2
(45) Date of Patent: Jan. 25, 2005

(54) SYSTEM AND METHOD FOR COMBUSTION ENGINES

(75) Inventor: Anders H. Johnsson, Göteborg (SE)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 10/775,559

(22) Filed: Feb. 10, 2004

(65) Prior Publication Data

US 2004/0182377 A1 Sep. 23, 2004

(30) Foreign Application Priority Data

Feb. 10, 2003 (EP) ............................................. 03002925

(51) Int. Cl.$^7$ ............................................. F02M 51/00
(52) U.S. Cl. ...................... 123/492; 123/493; 701/109
(58) Field of Search ................................. 123/492, 493, 123/679; 701/109

(56) References Cited

U.S. PATENT DOCUMENTS

| | | | | |
|---|---|---|---|---|
| 4,852,538 A | * | 8/1989 | Nagaishi | 123/492 |
| 5,408,972 A | * | 4/1995 | Servati | 123/478 |
| 5,584,277 A | * | 12/1996 | Chen et al. | 123/480 |
| 5,634,449 A | * | 6/1997 | Matsumoto et al. | 123/491 |
| 5,690,087 A | * | 11/1997 | Schumacher et al. | 123/675 |
| 5,711,272 A | | 1/1998 | Maegawa et al. | |
| 5,819,714 A | * | 10/1998 | Bush et al. | 123/673 |
| 6,079,396 A | * | 6/2000 | Ament et al. | 123/674 |
| 6,176,222 B1 | | 1/2001 | Kirwan et al. | |
| 6,178,949 B1 | * | 1/2001 | Kirwan et al. | 123/435 |
| 6,283,102 B1 | | 9/2001 | Nelson et al. | |
| 6,295,808 B1 | | 10/2001 | Griffin et al. | |

FOREIGN PATENT DOCUMENTS

EP          1178203 A2          2/2002

* cited by examiner

Primary Examiner—John T. Kwon
(74) Attorney, Agent, or Firm—Diana D. Brehob

(57) ABSTRACT

The invention relates to a method for improving combustion in a combustion chamber of a combustion engine. The method comprises the first step of receiving a measured air-to-fuel ratio value. Further, the method comprises the step of receiving at least one estimated air-to-fuel ratio value. The air-to-fuel ratio estimate is generated in dependence of a predetermined fuel deposit factor. Furthermore, the method comprises the step of establishing a fuel volatility value in dependence of said measured air-to-fuel ratio value and said air-to-fuel ratio estimate. Finally the method comprises the step of controlling combustion in dependence of said fuel volatility value.

15 Claims, 9 Drawing Sheets

SYSTEM AND METHOD FOR COMBUSTION ENGINES

The present invention relates to vehicle combustion engines and to a method and a system for improving combustion in a combustion chamber of a combustion engine.

BACKGROUND OF THE INVENTION

Fuels for spark-ignition engines must conform to stringent specifications regarding their volatility characteristics to ensure satisfactory operation of combustion engines. The fuel must contain a large enough fraction of highly volatile components for good cold starts of the engine, but the volatility must not be so high as to impair operation and starting, or during driving, when the engine is warm.

The volatility has a major influence of the wall-wet dynamics in the cylinders in for example port-injected gasoline engines. A fuel having different fuel volatility will result in a changed air-to-fuel ratio, which may lead to a non-desired combustion.

SUMMARY OF THE INVENTION

An aspect of the invention relates to the problem of achieving an improved operation of a combustion engine.

This object is achieved by a method including: receiving a measured air-to-fuel ratio value, receiving at least one estimated air-to-fuel ratio value, said air-to-fuel ratio estimate being generated in dependence of a predetermined fuel deposit factor, establishing a fuel volatility value in dependence of said measured air-to-fuel ratio value and said air-to-fuel ratio estimate, and controlling combustion in dependence of said fuel volatility value.

By establishing the volatility of the fuel, it is possible to compensate the wall-wet functions and/or models in the Engine Control Unit and reach an improved combustion quality. Thereby, the engine is automatically optimised even for fuels that significantly differs from the fuel for which the engine was originally adapted.

According to an embodiment said measured air-to-fuel ratio value is compared to said air-to-fuel ratio estimate, and said a fuel volatility value is generated in dependence of said comparison. This advantageously allows for adapting the combustion control in dependence of the actual fuel quality, which is currently used for the engine. Thereby, commercial fuel from markets world-wide may be used, even though the fuel quality may vary within a wide range.

Since an aspect of the invention is based on comparisons between mutually different estimated air-to-fuel values and a measured value as to establish a fuel volatility value, it is preferred to use a large number of estimated air-to-fuel ratio values in the model. A large number of estimated air-to-fuel ratio values would increase the accuracy of the established fuel volatility value, which leads to a better combustion control of the engine

BRIEF DESCRIPTION OF THE DRAWINGS

The invention will now be described in greater detail with aid of the enclosed drawings in which.

DETAILED DESCRIPTION OF THE PREFERRED EMBODIMENTS

Figure 1:
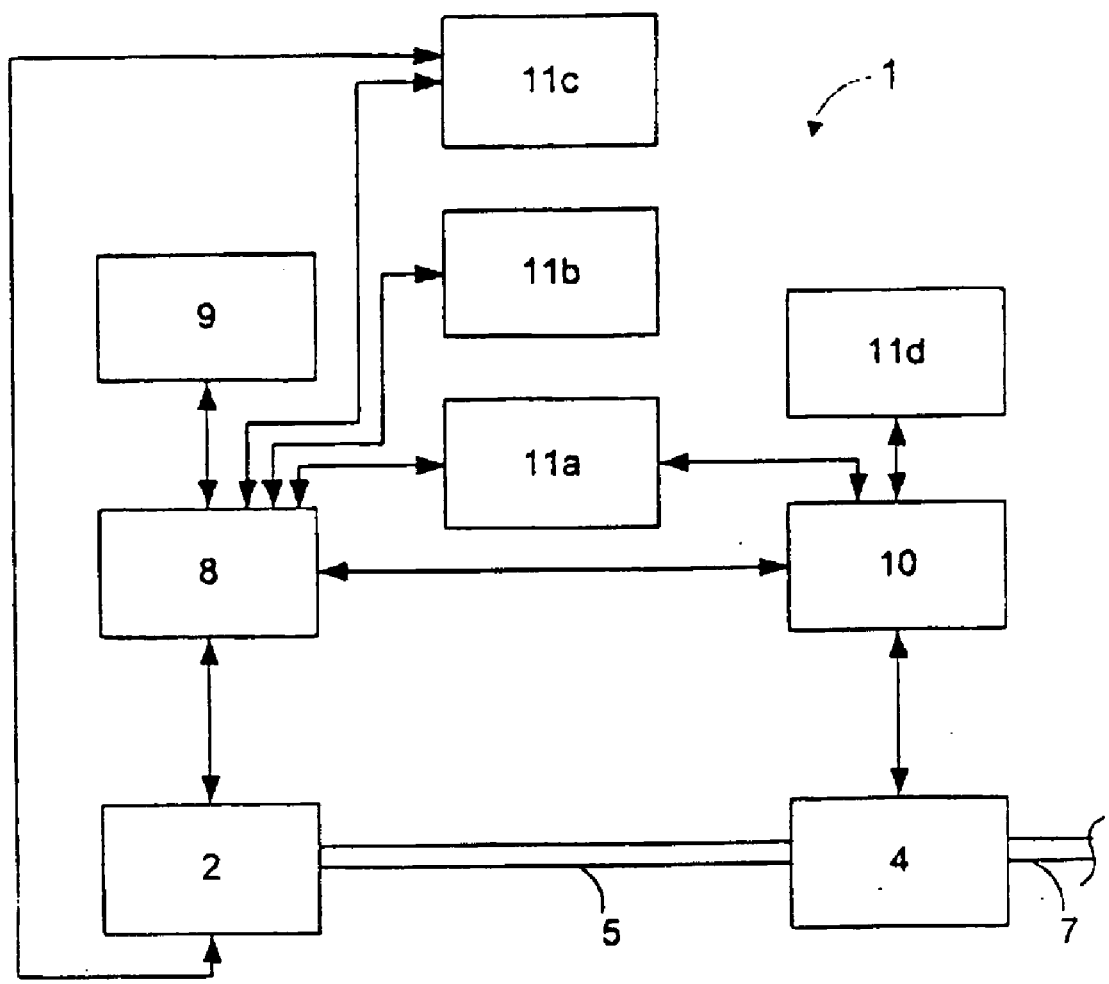
FIG. 1 is a block diagram depicting a vehicle drivetrain and a control system therefore.

FIG. 1 shows schematically a vehicle drivetrain 1 and a control system therefore. The drivetrain comprises an internal combustion engine 2 and a drivetrain member in the form of a gear unit 4. A shaft 5 is coupled between the engine 2 and the gear unit 4, which shaft 5 works as force transmitting means. A transmission output shaft 7 drives the wheels of the vehicle for its propulsion.

A control unit 8, such as an Engine Control Unit (ECU), is adapted to receive signals from an accelerator member 9 of the drivetrain, said member 9 may be an accelerator pedal, and to receive condition parameters, such as engine condition parameters, from sensors 11, (11a, 11b, 11c and 11d), and to send signals to control the operation of the engine. A method according to the invention only needs input signals that are used today, i.e., no extra sensors are needed. The sensors 11a–d may be adapted for communication with the control unit 8 in various manners. Sensors may, such as 11a, be arranged between the control unit 8 and other control units, in this embodiment a Transmission Control Unit (TCU) 10. Alternatively, sensors 11b may be adapted for communication with the control unit 8 directly. Further, as shown in the figure, sensors 11c may be connected to both the control unit 8 and other vehicle drivetrain members, for example the engine 2. Furthermore, sensors 11d, may be adapted for communication with internal control units, such as the TCU 10, which may pre-treat data detected by sensors 11d and thereafter send relevant data to the control unit 8. Sensors 11a–d may include e.g., temperature sensors, throttle potentiometer, throttle switch, starter switch, Lambda sensor, pressure sensors and coolant temperature sensors. The control unit 8 processes signals from said sensors and controls different functions in respective drivetrain members.

The control unit 8 is adapted for communication with the Transmission Control Unit 10 (TCU). The TCU 10 is further particularly adapted to receive signals corresponding to transmission condition parameters and to send control signals to the transmission 4.

Figure 2:
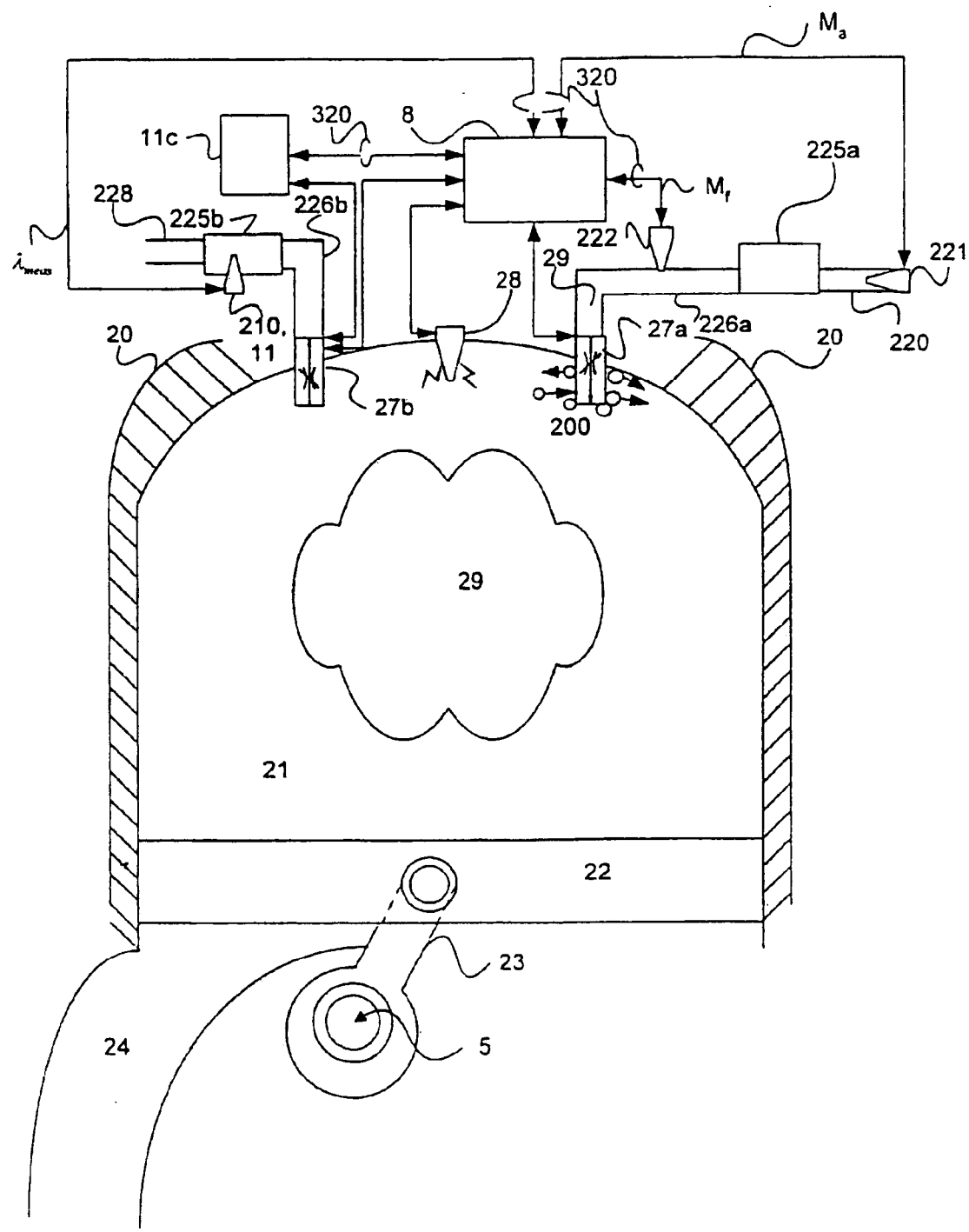
FIG. 2 schematically is illustrating an internal combustion chamber and a control system therefore.

FIG. 2 schematically is illustrating an internal combustion chamber in an engine of the vehicle drivetrain. Shown in the figure a reference number 20 denotes a cylinder block and reference number 21 a cylinder in which a piston 22 is displaceably mounted. The piston 22 may be connected with the crankshaft 5 (shown in FIG. 1) by a connecting rod 23 rotatably mounted in a crankcase 24 of the cylinder block 20. A lower frame bearing bridge and an oil pan, which together close the crankcase; are omitted from FIG. 2.

A throttle body 221 is adapted to feed air, via an intake air pipe 220 and an intake manifold 225a, to a channel 226a.

The throttle body 221 could be the compressor of a turbocharger or supercharger. Alternatively, the engine could be naturally aspirated. A fuel injector 222 is adapted to supply fuel into the channel 226a, which channel connects the intake manifold 225a with a valve 27a. The control unit 8 is adapted for communication with the fuel injector 222 and to control the amount of delivered fuel into the channel 226a. The control unit 8 is also adapted for communication with the throttle body 221 and to control the amount of delivered air into intake manifold 225a.

Air and fuel is mixed in the channel 226a to an air-and-fuel mixture 29. The air-and-fuel mixture 29 is fed to valves 27a via the channel 226a and further supplied into the cylinder 21 via said valves 27a. The intake manifold may be connected to a plurality of valves 27a, even though just one connection is shown in the figure. The number of valves 27a in each of the cylinders of the engine 2 may be a plurality of valves, even though only one valve 27a is illustrated in FIG. 2. The control unit 8 is adapted for communication with the valve 27a and to control the air-and-fuel mixture supply into the cylinder 21. The injection, through the valves 27a, of the air-and-fuel mixture 29 is controlled as to disperse as evenly as possible in the cylinder barrel. For initialisation of combustion of the air-and-fuel mixture 29 in the cylinder barrel, a spark plug 28 is arranged to enable the provision of sparks in the cylinder. The sparks generated by the spark plug 28 may be controlled by the control unit 8.

At and in the inlet valve 27a, the dynamics of illustrated fuel droplets are shown heavily enlarged at 200. This dynamics is of particular interest for the present invention. By estimating the wall-wet dynamics during engine load changes, using a model-bank algorithm, fuel volatility can be identified in real time.

The air-and-fuel mixture injected into the cylinder 21 may be subject to phase transformation in different stages of the Otto-cycle. Some of the injected fuel may be attached to the inlet port wall. The fuel attached to the wall, regardless of what phase it may be in (e.g., fluid or gas), may in a later stage, e.g. when de-attached, influence the present air-to-fuel ratio value in the cylinder 21, also referred to as λ-value.

A lambda sensor 210 is provided for generating a measured relative air-to-fuel ratio value. Lambda is the actual air-to-fuel ratio divided by the air-to-fuel ratio at a stoichiometric proportion. Stoichiometric proportion is the ratio of fuel to air that would theoretically completely consume both the fuel and air. The term air-to-fuel ratio is used throughout this specification since it can be easily computed from the relative air-to-fuel ratio, lambda, and the stoichiometric air-to-fuel ratio, which is a known quantity for a given fuel. The Lambda sensor may be placed in an exhaust manifold 225b. A channel 226b connects an exhaust valve 27b and the exhaust manifold 225b. Said manifold has an exhaust pipe 228, in which exhaust gases from the cylinder 21 are diverted via the exhaust valve 27b. The combustion chamber may comprise a plurality of exhaust valves 27b, even though just one valve 27b is shown in the figure. The control unit 8 is adapted for communication with the valve 27b and to control said valve 27b. The Lambda sensor is adapted to communicate with the control unit 8, and in particular to transmit a measured air-to-fuel ratio value to said control unit 8. The Lambda sensor may measure an average of air-to-fuel ratio of several cylinders of the engine.

Figure 3A:
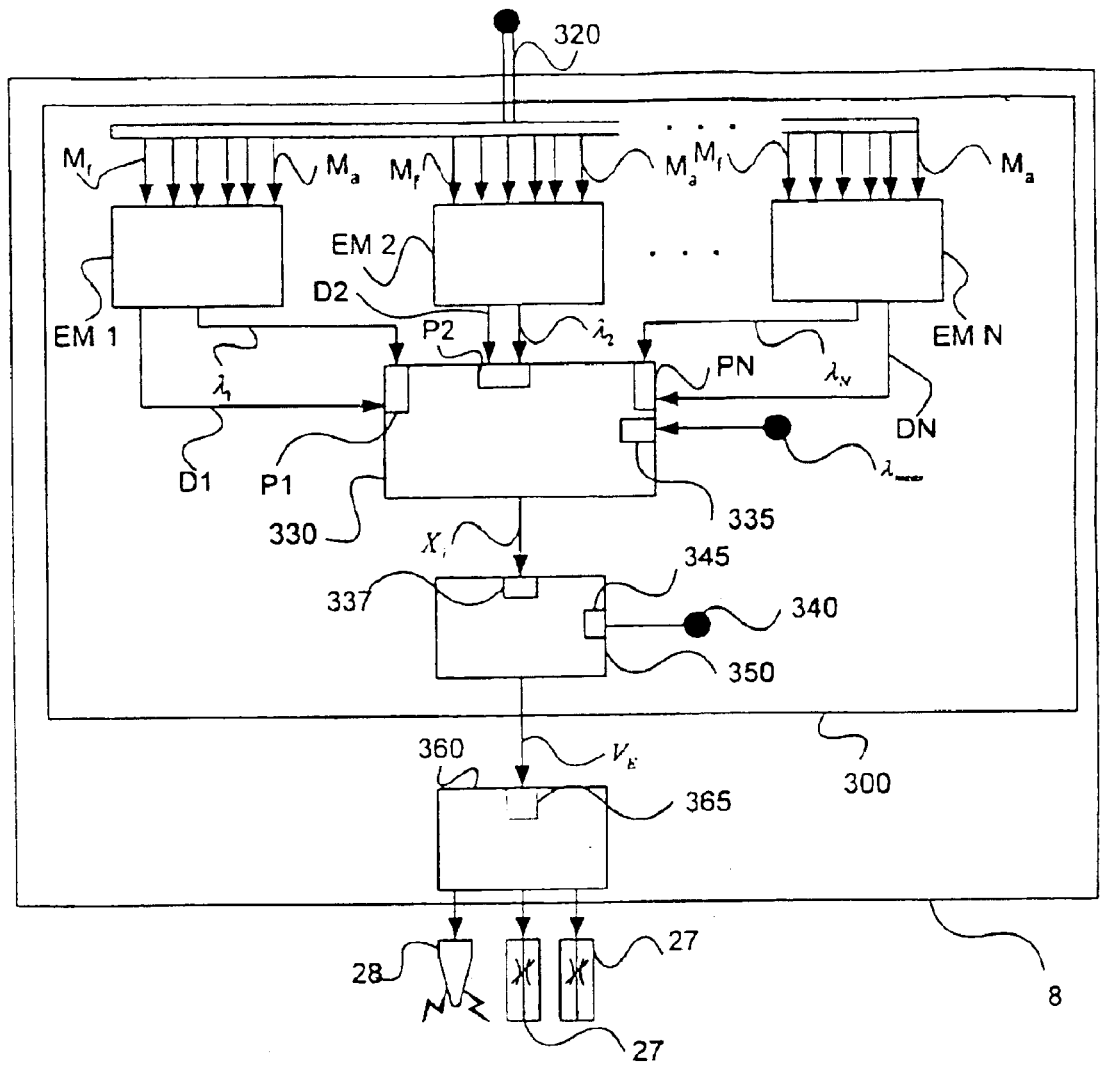
FIGS. 3a and 3b are illustrating a block diagram of a system according to an aspect of the present invention.

FIG. 3a schematically illustrates an embodiment of a system according to the invention. The model bank method is adapted to identify the wall-wet dynamics in the inlet ports of the vehicle drivetrain, and in particular to identify the deposit factor X so as to estimate the volatility.

Figure 3B:
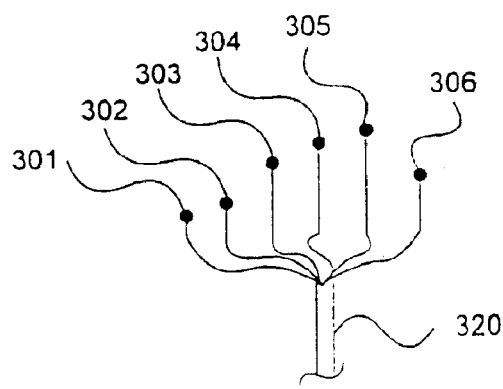

Sensors 11a–d (FIG. 1) are adapted to detect and transmit input data to the control unit 8 of the vehicle drivetrain, via a data bus 320. The input data comprises data, such as in-cylindrical injected fuel amount 301, in-cylindrical air amount 302, engine speed 303, engine load 304, by a lambda sensor measured lambda value 305, coolant temperature 306, etc. Data bus 320 may transmit data from sensors 11a–d, is illustrated in FIG. 3b showing a few examples of input data (301–306). It should be understood that a plurality of other relevant data may be transmitted from sensors 11a–d via the data bus 320.

The data may be processed to desirable format in anyone of the sensors 11a–d, which is of immediate interest. Alternatively, the data is transmitted to the control unit 8 and processed there. For example, the detected signal may be transformed from analogue to digital format by an A/D-converter integrated in respective sensor, or in the control unit 8.

The control unit 8 comprises a volatility generator 300 and a combustion controller 360. The volatility generator 300 and the combustion controller 360 are adapted for communication with each other.

The data bus 320 transmits the input data in parallel to a number N ($1 \leq i \leq N, i \epsilon Z^+$) of engine models $EM_1$-$EM_N$, which provide a model bank. Z+ means positive integers, the number of engine models are thus N and i represents any positive integer between 1 and N. Each engine model $EM_i$ comprises a calculator device adapted to generate an air-to-fuel ratio value $\lambda_i$. According to one embodiment the engine models are identical in all aspects but one. Each engine model uses a unique predetermined deposit factor value $X_i$ in the calculation process. For example, the engine model $EM_1$ may have a unique predetermined deposit factor value $X_i$ which equals 0.01 ($X_1$=0.01). In response to signals from the sensors 11a–d in combination with the unique deposit factor value it generates a corresponding air-to-fuel ratio $\lambda_i$ as shown in FIG. 3a. The other engine models $EM_2$-$EM_N$ of the model bank work in a corresponding manner. Each one of the individual engine models $EM_i$ use the same input data but on the basis of individual and mutually different predetermined deposit factors, each engine model generates a unique air-to-fuel ratio value $\lambda_i$. Said unique air-to-fuel ratio values are sent to process unit 330. Said unique air-to-fuel ratio values are also referred to as air-to-fuel ratio estimates.

Process unit 330 is adapted to receive input data D1-DN from the engine models $EM_1$-$EM_N$ in data ports P1-PN, respectively. The input data D1–DN may be signals 301–306. Further, a air-to-fuel ratio value sensor, preferably placed downstream the cylinders of the vehicle drivetrain 1, as shown in FIG. 2, is adapted to measure and transmit a measured value of the air-to-fuel ratio $\lambda_{meas}$, to the control unit 8.

The process unit 330 processes both the air-to-fuel ratio estimates and the measured air-to-fuel ratio value. This may be performed in different ways. According to an embodiment of the invention the mutually different air-to-fuel ratio estimates are compared to the measured air-to-fuel value during engine load changes such that a best estimate of the actual deposit factor is obtained.

According to an aspect of the invention the comparison is based on in real time generated derivatives of the estimated air-to-fuel ratio value(s). At least one derivative of each estimated air-to-fuel ratio value may be calculated. The derivatives may be of one or several orders. The derivatives may be calculated with respect to time, when the dynamics of the model is exited by a load change. The derivatives may be calculated with respect to other parameters, such as engine load and engine speed. Corresponding derivatives are calculated for the measured air-to-fuel ratio value. The generated processed estimated air-to-fuel ratio value, which has the least integrated error during a certain time period compared with the generated processed measured air-to-fuel ratio value, is to be chosen as the best estimated value. The corresponding deposit factor, which may be stored in ditto engine model, is denominated output data $X_i$ and is transmitted to process unit 350.

The deposit factor $X_i$ is received in an input 337 of process unit 350. In the process unit 350 another comparison process is performed. The selected deposit factor $X_i$ is delivered to an input 345 of process unit 350. The method according to the invention is particularly advantageous at cold start of the engine, or actually while the engine is cold. According to an embodiment, the engine temperature detected by sensor 11c, and the detected temperature value is delivered on input 340 to process unit 350.

According to an embodiment, there is provided a plurality of reference fuel models in the process unit 350. Input data is detected in real time by sensors 11a–d and transmitted to the control unit 8 via data bus 340 and taken into account in process unit 350. In dependence of said input data, e.g., engine temperature, said output data $X_i$ is compared to at least one X-estimate of a reference fuel, which has been determined during calibration and stored in a memory (not shown) in process unit 350.

The process unit 350 further generates an estimation of the fuel volatility in dependence of said output data $X_i$ and said at least one X-value of a reference fuel, which volatility estimate is transmitted as output $V_E$ to an input 365 in a combustion controller 360 for further processing.

The volatility generator 300 comprises the features $EM_1$-$EM_N$, 330 and 350.

The combustion controller 360, may use the volatility estimate as to compensate wall-wet functions, used by the control unit 8 for controlling the engine 2, as to improve combustion quality in the cylinders of the engine's cylinders by transmitting control signals to the valves 27 and the spark plug 28.

Figure 3C:
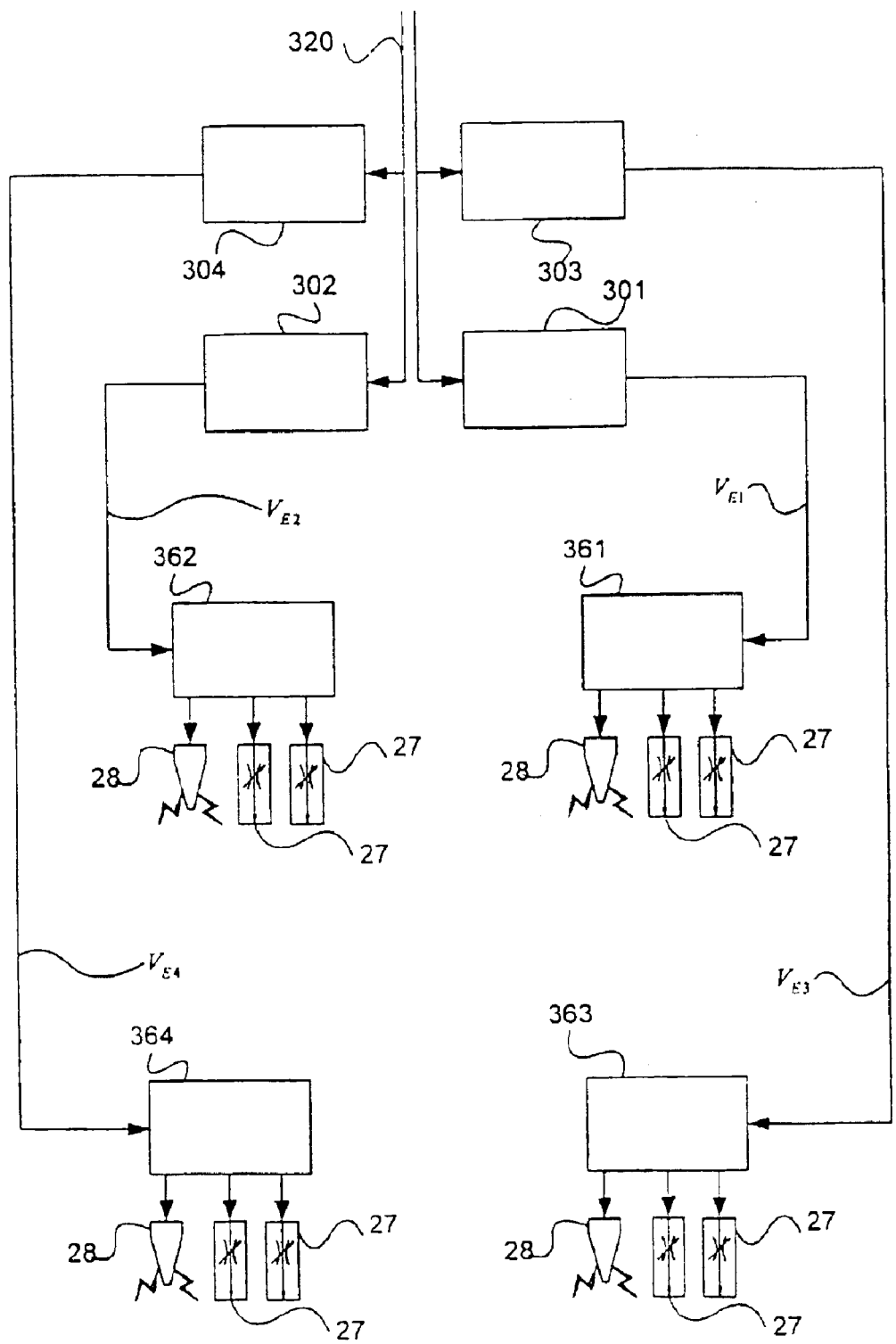
FIG. 3c is illustrating a block diagram of a system according to yet an aspect of the present invention.

FIG. 3c illustrates an embodiment of the invention in which four different volatility generators 301, 302, 303 and 304 are fed by the data bus 320 as above. Also, a lambda sensor for each cylinder is adapted to measure an air-to-fuel ratio value in respective cylinder and transmit said value to the corresponding volatility generator. According to this embodiment, the volatility generators 301–304 are adapted to communication with combustion controllers 361, 362, 363 and 364, respectively. The volatility generators 301–304 generate volatility estimates $V_{E1}$-$V_{E4}$ and transmit these estimates respective combustion controller, as shown in figure. The combustion controllers 361–364 individually controls a separate cylinder of the engine 2. Thus, in this embodiment, the engine comprises four cylinders.

Figure 4A:
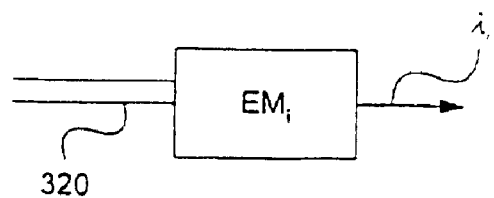
FIGS. 4a and 4b are flow charts depicting a method according to an aspect of the invention.
Figure 4B:
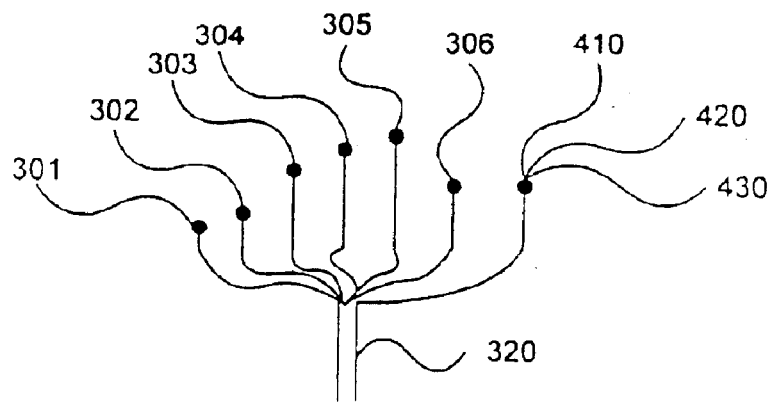
Figure 4C:
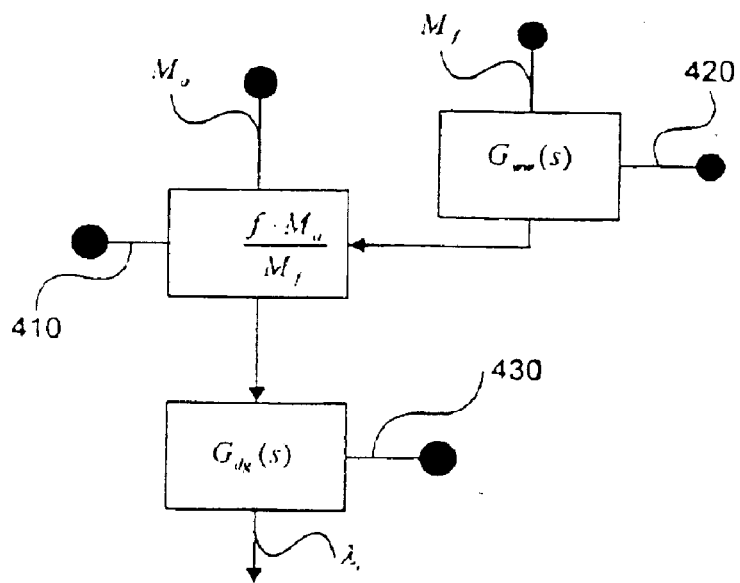
FIG. 4c shows in greater detail a method according to an aspect of the invention.

FIG. 4 is a block diagram illustrating an overview of an engine model EM for identification of the wall-wet dynamics according to an aspect of the invention.

The wall-wet model is the Aquino model $G_{ww}$:

$$G_{ww}(s) = \frac{(1-X)\cdot\tau_{ww}\cdot s + 1}{\tau_{ww}\cdot s + 1}$$

where X is the portion of the injected fuel depositing on the wall, referred to as deposit factor, as shown in FIG. 2 at 200, and $\tau_{ww}$ is the evaporation time constant. Both X and $\tau_{ww}$ depends on the volatility of the fuel as well as of, e.g., engine temperature, engine load and speed. These properties are detected and transmitted as input data to the model and taken into account at different calculation stages as 410, 420 and 430, respectively.

The model of the gas dynamics $G_{gd}$ in the cylinder of the engine is:

$$G_{gd} = \frac{e^{-T_d\cdot s}}{\tau_{gd}\cdot s + 1}$$

where both the delay $T_d$ and the time constant $\tau_{gd}$ is mapped against engine load 304 and engine speed 303. Preferably, the input signals $M_a$, $M_f$, 410, 420 and 430 are delayed with $T_d$ to compensate for the time delay in the gas dynamics.

Figure 5:
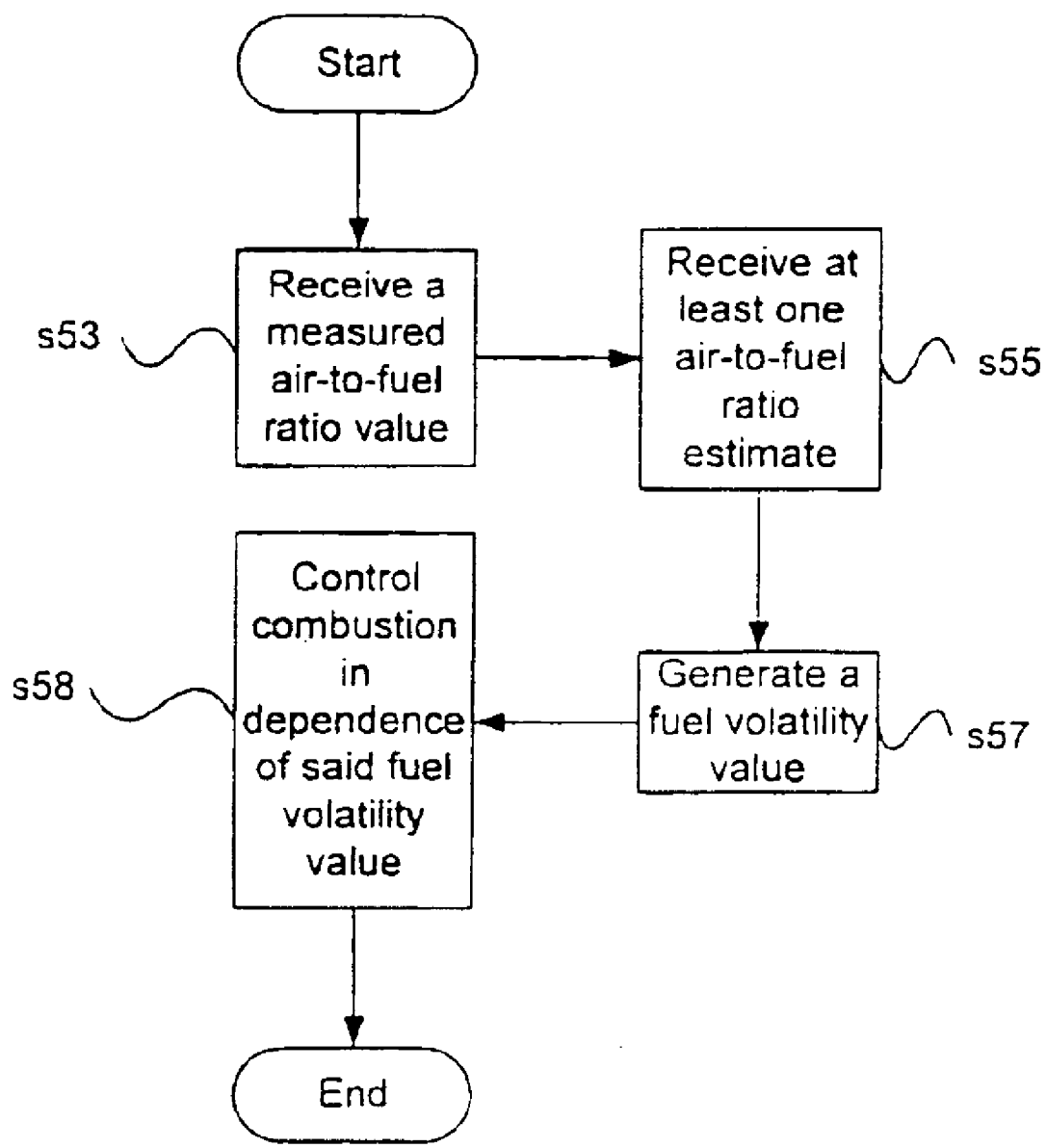
FIG. 5 is a flow chart of depicting a method according to an aspect of the invention.

FIG. 5 is a flow chart depicting a method of operating the control units shown in FIG. 3a according to an aspect of the invention. In this embodiment, the combustion chamber is the cylinder 21, shown in FIG. 2. The step s53 is to receive a measured air-to-fuel ratio value. The next step s55 is to receive a plurality of air-to-fuel ratio estimates, said air-to-fuel estimates being generated in dependence of a predetermined deposit factor. With reference to FIG. 3a, each engine model $Em_i$-$EM_N$ may generate mutually different air-to-fuel ratio estimates. Step s57 is to generate a fuel volatility value in dependence of said measured air-to-fuel ratio value and said air-to-fuel ratio estimate, and finally, step s58 is to control combustion in dependence of said fuel volatility value.

Figure 6:
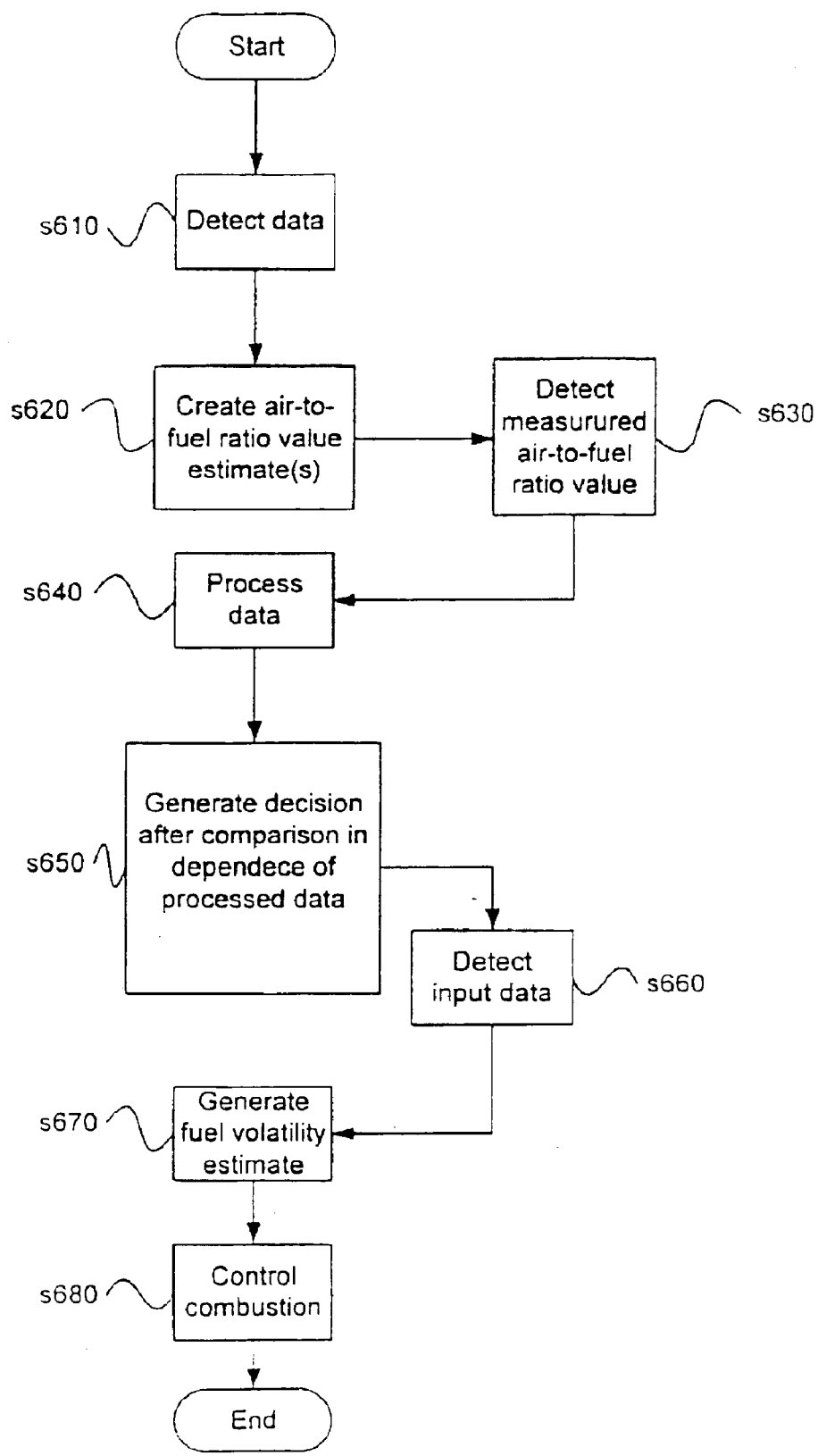
FIG. 6 shows a flow chart of a method according to yet an aspect of the invention.

FIG. 6 shows a flow chart of a method according to an aspect of the invention. Input data 301–306, among others, is detected in step s610 by sensors 11a–d, as described above, and transmitted to the control unit 8 wherein the following steps are performed. Preferably, step s620 is performed by a plurality of engine models $EM_i$-$EM_N$, each engine model generating at least one estimate. Each of the generated air-to-fuel estimates is unique, based on the fact that each air-to-fuel ratio estimate is generated for a certain value of the deposit factor, as described above. In step s630, a value of current air-to-fuel ratio value in a cylinder is detected in step s630. This is also referred to as measured air-to-fuel ratio value. It is to be considered to be obvious for a person skilled in the art to realize that the method may be applied for all cylinders in the engine 2, provided that there is one Lambda sensor measuring air-to-fuel ratio values for each cylinder. Further, the created air-to-fuel ratio estimates (from step s620) and the measured (step s630) air-to-fuel ratio value are processed in step s640. This comparison takes place in step s650. According to an embodiment, each air-to-fuel ratio estimate is compared to the measured air-to-fuel ratio value and the estimate whose value is nearest to the measured air-to-fuel ratio value is chosen. This chosen air-to fuel-ratio estimate corresponds to a certain deposit factor value. More precisely that air-to-fuel ratio estimate, which is generated in step s620 from a predetermined deposit factor. In step s650, that deposit factor is selected. Input data, detected in step s660 by sensors 11a–d, is needed for generating a volatility estimate carried out in step s670. Said input data comprises at least engine temperature and is used for the estimation performed in step s670. The estimation is performed by, for example, an identification method in which the chosen deposit factor is compared with deposit factors of reference fuels. In dependence of the generated volatility estimate, the combustion in a combustion chamber is controlled as to improve combustion quality in step s680.

According to another embodiment, step s650 compares an integral value of the air-to-fuel ratio estimates and the measured air-to-fuel ratio value.

According to another embodiment, step s650 compares time-derivatives of the air-to-fuel ratio estimates and the measured air-to-fuel ratio value as to enable to compare the dynamics and reduce any offset error in the estimated air-to-fuel ratio values According to another embodiment, step s650 compares an integral value of the air-to-fuel ratio estimates and the measured air-to-fuel ratio value related to mapped information in dependence of in step s610 detected data.

According to yet another embodiment, step s680 the combustion in a plurality of combustion chambers are controlled.

Figure 7:
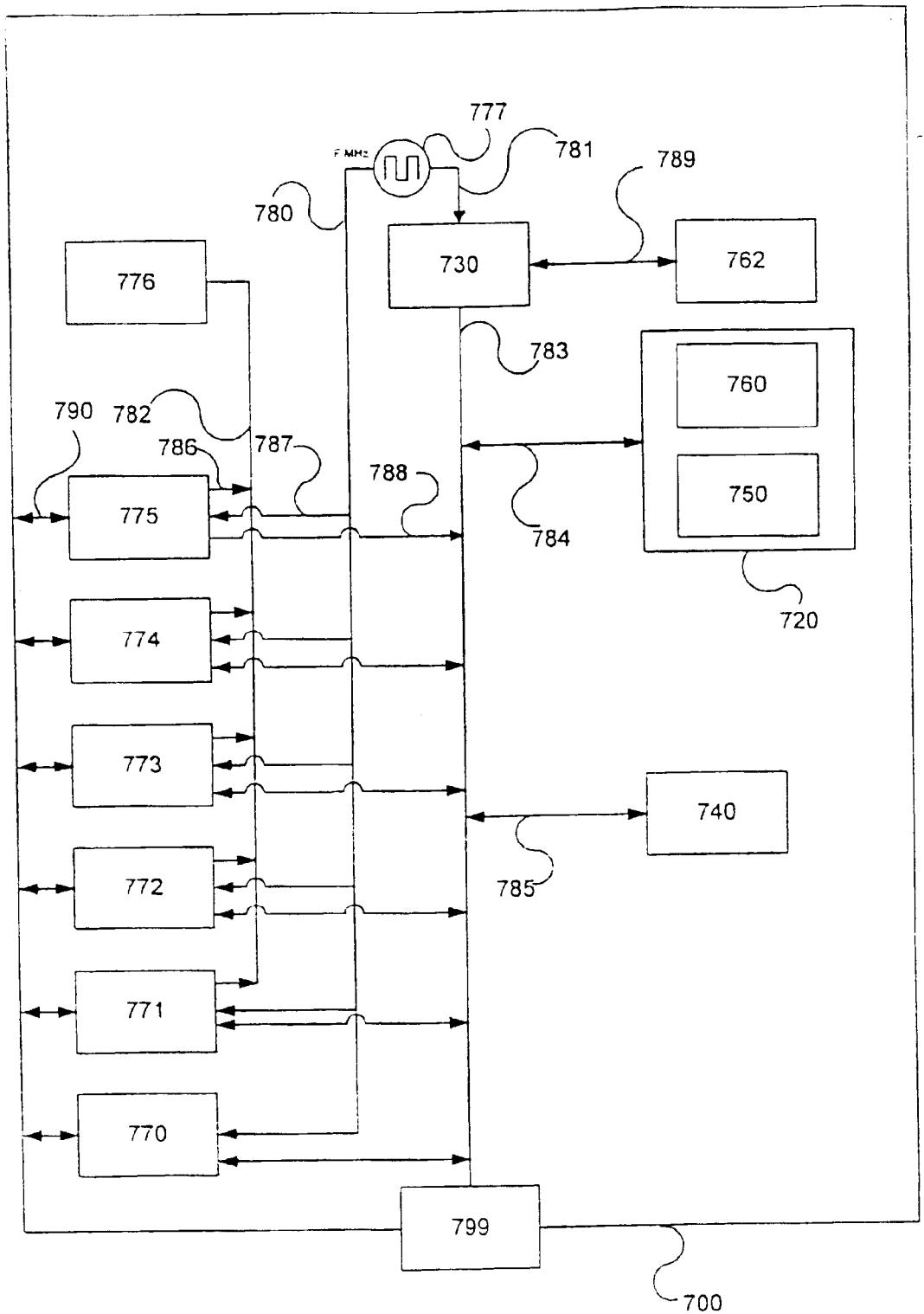
FIG. 7 is a block diagram illustrating a microcomputer, which may be used in the present invention.

With reference to FIG. 7, there is shown a diagram of one way of embodying an apparatus 700. The above mentioned control unit 8 may include an apparatus 700. The apparatus 700 comprises a non-volatile memory 720, a data processing device 730 and a read/write memory 740. The memory 720 has a first memory portion 750 wherein a computer program, such as an operating system, is stored for controlling the function of the apparatus 700. Further, the apparatus 700 comprises a bus controller 770, a serial communication port 771, I/O-means 772, an A/D-converter 773, a time date entry and transmission unit 774, an event counter 775 and an interrupt controller 776. Even further, the apparatus 700 comprises a data port 799.

The data processing device 730 may be embodied by, for example, a microprocessor.

The memory 720 also has a second memory portion 760, where a program for improving combustion quality in a combustion chamber is stored. In another embodiment, the program for improving combustion quality in a combustion chamber is stored on a separate non-volatile recording medium 762. The program may be stored in an executable manner or in a compressed state.

When, in the following, it is described that the data processing device 730 performs a certain function, this is to be understood that the data processing device 730 performs a certain part of the program which is stored in the memory 760 or a certain part of the program which is stored in the recording medium 762.

An internal clock 777, which is adapted to generate clock cycle, pulses having a frequency of F MHz. The internal clock 777 is coupled to the data processing means 730 by means of a data bus 781, and to the bus controller 770 by means of a data bus 780. The data processing device 730 may communicate with a data port 799 by means of a data bus 783. The memory 720 is adapted for communication with the data bus 783 via data bus 785. The separate non-volatile recording medium 762 is adapted to communicate with the data processing device 730 via data bus 789. The read/write memory 740 is adapted to communicate with the data bus 783 via a data bus 785. Internal features 771–775 is fed by the internal clock 777 via a data bus 787 connected to the data bus 780, respectively (only showed for 775 in the figure). The bus controller 770 is fed directly by the data bus 780. Further, the internal features 770–775 are adapted to communicate with the data bus 783 via a data bus 788 (only showed for 775 in the figure). The internal features 771–775 are adapted to communicate with the data bus 782 and each of the internal features 770–775 is adapted for communication with an external unit by a bus 790, respectively (only showed for 775 in the figure).

The methods described with reference to FIG. 5 and 6 can be performed by the apparatus 700 by means of the data processing device 730 running the program stored in the memory portion 760. When the apparatus 700 runs the program the method described with reference to FIG. 5 and/or FIG. 6 is executed. Thereby, the data processing device 730 is set up to wait for reception of input data 301–306 via data bus 320, such as measured air-to-fuel ratio value and input data 340 on the data port 799, or in the I/O unit 710. When the data is received on the data port 799 said input data is temporarily stored in the read/write memory 740. When all the received input data have been temporarily stored, the data processing device is set up to perform the calculations in a manner described above, such as a fuel volatility estimate is created.

Figure 8A:
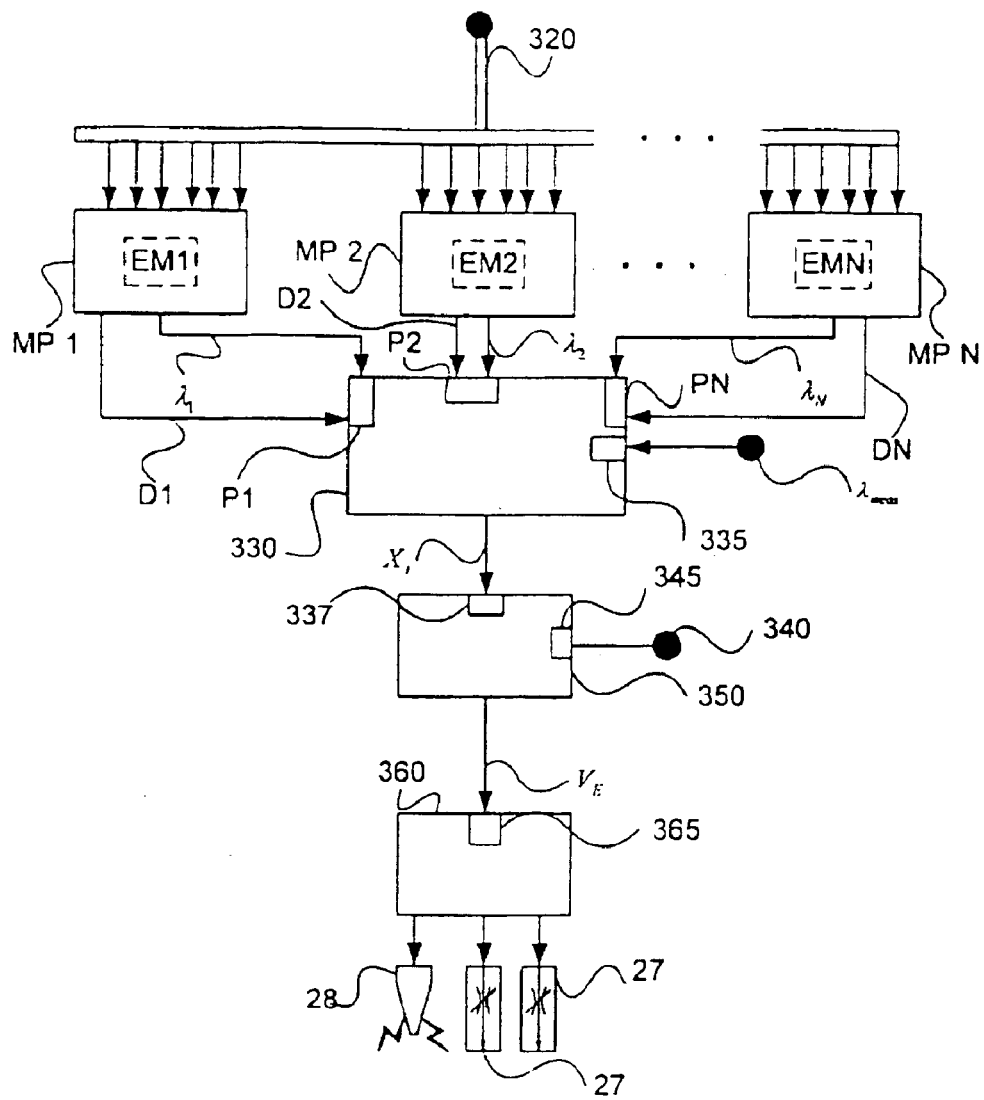
FIGS. 8a and 8b are illustrating a block diagram of another aspect of the invention.
Figure 8B:
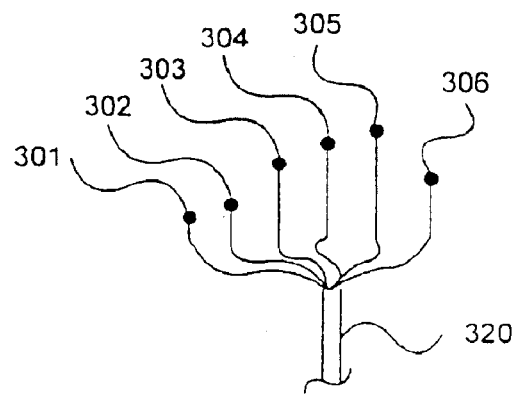

FIG. 8 is illustrating a block diagram of yet an aspect of the invention.

The features according to this aspect of the invention are essentially functioning as the corresponding features in FIG. 3a, except that each processor unit and each engine model $EM_1$-$EM_N$ is a separate processor unit and not provided in one control unit 8.

Although the FIG. 8 refers to microprocessors MP1-MPN it is to be understood that each device MP1-MPN may be embodied by an apparatus 700 as described with reference to FIG. 7. Each microprocessor MP1-MPN comprises an engine model Emi, respectively, and in accordance with FIG. 3a.

What is claimed is:

1. A method for controlling combustion in a combustion chamber of a combustion engine, comprising:

receiving (s53) a measured air-to-fuel ratio value, receiving (s55) at least one estimated air-to-fuel ratio value, said air-to-fuel ratio estimate being generated in dependence of a predetermined fuel deposit factor, establishing a fuel volatility value in dependence of said measured air-to-fuel ratio value and said air-to-fuel ratio estimate, and controlling combustion in dependence of said fuel volatility value.

2. A method according to claim 1, wherein said measured air-to-fuel ratio value is compared to said air-to-fuel ratio estimate and said fuel volatility value is generated in dependence of said comparison.

3. A method according to claim 1, wherein said fuel volatility value is generated in dependence of said measured air-to-fuel ratio value and a plurality of air-to-fuel ratio estimates.

4. A method according to claim 3, wherein said plurality of air-to-fuel ratio estimates are of mutually different values.

5. A method according to claim 1, wherein said at least one air-to-fuel ratio estimate is generated in dependence of a predetermined fuel deposit factor ($X_i$) and at least one detected engine parameter value ($M_f$, $M_a$).

6. A method according to claim 4, wherein said plurality of mutually different air-to-fuel ratio estimates are generated in dependence of the same detected engine parameter value ($M_f$, $M_a$) and mutually different predetermined fuel deposit factor ($X_i$).

7. A method according to claim 1, wherein said measured air-to-fuel ratio value is delivered by an air-to fuel ratio sensor (210, 11c) positioned to detect an actual air-to-fuel ratio in an exhaust manifold (225a).

8. A system for controlling combustion in a combustion chamber of a combustion engine, comprising:

first means (335) for receiving a measured air-to-fuel ratio value ($\lambda_{meas}$), second means (P1, P2 . . . PN) for receiving at least one air-to-fuel ratio estimate ($\lambda_1, \lambda_2 \ldots \lambda_N$), said air-to-fuel ratio estimate being generated in dependence of a predetermined fuel deposit factor, third means (330, 700) for generating a fuel volatility value in dependence of said measured air-to-fuel ratio value and said air-to-fuel ratio estimate, and fourth means (360) for controlling combustion in dependence of said fuel volatility value.

9. A system according to claim 8, wherein said third means (330, 700) is adapted to compare said measured air-to-fuel ratio value to said air-to-fuel ratio estimate and to generate said fuel volatility value in dependence of said comparison.

10. A system according to claim 8, wherein said fuel volatility value is generated in dependence of said measured air-to-fuel ratio value and a plurality of air-to-fuel ratio estimates ($\lambda_1, \lambda_2 \ldots \lambda_N$).

11. A system according to claim 8, wherein said plurality of air-to-fuel ratio estimates ($\lambda_1, \lambda_2 \ldots \lambda_N$) are of mutually different values.

12. A system according to claim 8, wherein said third means (330, 700) is adapted to generate at least one air-to-fuel ratio estimate ($\lambda_1, \lambda_2 \ldots \lambda_N$) in dependence of a predetermined fuel deposit factor ($X_i$) and at least one detected engine parameter value ($M_f, M_a$).

13. A system according to claim 8, wherein said third means (330, 700) is adapted to generate a plurality of mutually different air-to-fuel ratio estimates ($\lambda_1, \lambda_2 \ldots \lambda_N$) in dependence of the same detected engine parameter value ($M_f, M_a$) and mutually different predetermined fuel deposit factor ($X_i$).

14. A system according to claim 8, wherein said air-to-fuel ratio sensor (210, 11) is positioned to detect an actual air-to-fuel ratio value in an exhaust pipe (228) and adapted to deliver said measured air-to-fuel ratio value ($\lambda_{meas}$).

15. A computer program for causing a computerized apparatus (8; 700) to improve combustion in a combustion chamber of a combustion engine, comprising:

a computer readable code means which, when run on a computerized apparatus (8, 700), causes the computerized apparatus (8; 700) to:

receive (s53) a measured air-to-fuel ratio value, receive (s55) at least one estimated air-to-fuel ratio value, said air-to-fuel ratio estimate being generated in dependence of a predetermined fuel deposit factor, establish a fuel volatility value in dependence of said measured air-to-fuel ratio value and said air-to-fuel ratio estimate, and control combustion in dependence of said fuel volatility value.

* * * * *